United States Patent
Wang et al.

(10) Patent No.: US 7,620,553 B2
(45) Date of Patent: Nov. 17, 2009

(54) SIMULTANEOUS SUPPORT OF ISOLATED AND CONNECTED PHRASE COMMAND RECOGNITION IN AUTOMATIC SPEECH RECOGNITION SYSTEMS

(75) Inventors: Gang Wang, Goleta, CA (US); Matteo Contolini, Santa Barbara, CA (US); Chengyi Zheng, Goleta, CA (US); David Chatenever, Santa Barbara, CA (US); Heinz-Werner Stiller, Jestetten (DE)

(73) Assignee: Storz Endoskop Produktions GmbH (CH)

( * ) Notice: Subject to any disclaimer, the term of this patent is extended or adjusted under 35 U.S.C. 154(b) by 474 days.

(21) Appl. No.: 11/312,785

(22) Filed: Dec. 20, 2005

(65) Prior Publication Data

US 2007/0150288 A1    Jun. 28, 2007

(51) Int. Cl.
*G10L 21/00* (2006.01)
*G10L 15/00* (2006.01)
(52) U.S. Cl. .................. 704/275; 704/251; 704/270
(58) Field of Classification Search .................. None
See application file for complete search history.

(56) References Cited

U.S. PATENT DOCUMENTS

| | | | |
|---|---|---|---|
| 5,794,196 A * | 8/1998 | Yegnanarayanan et al. .. | 704/255 |
| 5,970,457 A | 10/1999 | Brant et al. .................. | 704/275 |
| 6,182,046 B1 * | 1/2001 | Ortega et al. ................ | 704/275 |
| 6,266,635 B1 | 7/2001 | Sneh .......................... | 704/235 |
| 6,278,975 B1 | 8/2001 | Brant et al. .................. | 704/275 |
| 6,301,560 B1 * | 10/2001 | Masters ...................... | 704/251 |
| 6,456,972 B1 * | 9/2002 | Gladstein et al. ............ | 704/257 |
| 6,463,361 B1 | 10/2002 | Wang et al. .................. | 700/258 |
| 6,591,239 B1 | 6/2003 | McCall et al. ............... | 704/275 |
| 6,587,818 B2 | 7/2003 | Kanevsky et al. ........... | 704/251 |
| 6,601,026 B2 | 7/2003 | Appelt et al. ................. | 704/9 |
| 6,642,836 B1 | 11/2003 | Wang et al. .................. | 340/3.54 |
| 6,839,668 B2 * | 1/2005 | Kuo et al. .................... | 704/244 |
| 7,505,910 B2 * | 3/2009 | Kujirai ........................ | 704/275 |
| 2002/0183894 A1 | 12/2002 | Wang et al. .................. | 700/245 |
| 2003/0197590 A1 | 10/2003 | Wang et al. .................. | 340/3.54 |
| 2004/0124964 A1 | 7/2004 | Wang et al. .................. | 340/3.54 |
| 2004/0172011 A1 | 9/2004 | Wang et al. .................. | 606/1 |
| 2009/0031236 A1 * | 1/2009 | Robertson et al. ........... | 715/765 |

FOREIGN PATENT DOCUMENTS

| EP | 1 801 780 | 6/2007 |
|---|---|---|
| WO | WO09113431 | * 9/1991 |

OTHER PUBLICATIONS

Golden, J. et al. "Automatic topic identification for two-level call routing," IEEE Conference on Acoustics, Speech and Signal Processing, Mar. 1999.*

* cited by examiner

*Primary Examiner*—Matthew J Sked
(74) *Attorney, Agent, or Firm*—St. Onge Steward Johnston & Reens LLC (57) ABSTRACT

A system for operating one or more devices using speech input including a receiver for receiving a speech input, a controller in communication with the receiver, software executing on the controller for converting the speech input into computer-readable data, software executing on the controller for generating a table of active commands, the table including a portion of all valid commands of the system, software executing on the controller for identifying at least one active command represented by the data, and software executing on the controller for transmitting the active command to at least one device operable by the active command.

22 Claims, 6 Drawing Sheets

SIMULTANEOUS SUPPORT OF ISOLATED AND CONNECTED PHRASE COMMAND RECOGNITION IN AUTOMATIC SPEECH RECOGNITION SYSTEMS

FIELD OF THE INVENTION

The invention relates to speech recognition systems, and more specifically to a system and method for the speech recognition which simultaneous recognizes isolated and connected phrase commands.

BACKGROUND OF THE INVENTION

Speech recognition is the process by which an acoustic signal received by microphone is converted to a set of text words, numbers, or symbols by a computer. These recognized words then can be used in a variety of computer software applications for purposes such as document preparation, data entry, and command and control. For example, speech recognition systems may be used in modern operating rooms to control various medical systems and devices. A surgeon or other user, by giving a simple voice command, may direct the functionality of a device controlled by the speech recognition system. For example, the surgeon may deliver a voice command to adjust a patient table or adjust the pressure of a pump.

To enable speech recognition in an operation room, medical devices and/or other equipment are connected with a component (e.g., a call system) through communication channels (e.g., an Ethernet connection, device bus, etc.). A speech recognition system is also connected providing the voice driven user interface and recognition software. When a voice command is issued, the command may be recognized and converted to a text string. If it is successfully identified as valid command corresponding to one of the connected devices, the system will send an appropriate signal so that the desired control action is taken.

In order to present what commands can be issued by the user, generally such systems adopt a tree-structured command menu. Each level of the command menu contains a collection of acceptable voice commands, each of which then leads to a sub-menu of new commands, if it is recognized. For example, U.S. Pat. No. 6,591,239 discloses a voice controlled surgical suite employing a tree-structured command menu. If a surgeon is attempting to adjust an operating table, the surgeon must first issue the command "table", pause to allow the command to be recognized and the table command sub-menu loaded, issue an applicable table command from the sub-menu, and so on.

Therefore, the known speech recognition systems generally do not save time in the operating room. The surgeon must issue multiple voice commands to effectuate a single action. Further, the known systems force surgeons to adopt an unnatural way of giving voice commands (e.g., isolated speech) that requires considerable practice before the surgeon can use the system efficiently.

It is therefore desired to provide a system and method for implementing speech commands which recognizes multiple speech commands delivered in a single utterance.

It is further desired to provide a system and method for implementing speech commands which recognizes both the traditional isolated speech commands as well as non-traditional commands without reconfiguring.

SUMMARY OF THE INVENTION

Accordingly, it is an object of the present invention to provide a speech recognition system which simultaneously supports isolated and connected or continuous speech.

It is a further object of the present invention to provide a speech recognition system which supports multiple modes of speech and further exceeds the speed and accuracy of known speech recognition systems.

These and other objectives are achieved by providing a system for operating one or more devices using speech input including a receiver for receiving a speech input, a controller in communication with said receiver, software executing on said controller for converting the speech input into computer-readable data, software executing on said controller for generating a table of active commands, the table including a portion of all valid commands of the system, software executing on said controller for identifying at least one active command represented by the data, and software executing on said controller for transmitting the active command to at least one device operable by the active command.

Further provided is a method of controlling a device using a speech input, including the steps of determining valid commands associated with each device of a system, generating a table of active commands, wherein the table includes a portion of the valid commands, receiving a speech input; converting the speech input into computer-readable data, identifying at least one active command represented by the data, and transmitting the active command to at least one device to which the active command pertains.

DETAILED DESCRIPTION OF THE DRAWINGS

Figure 1:
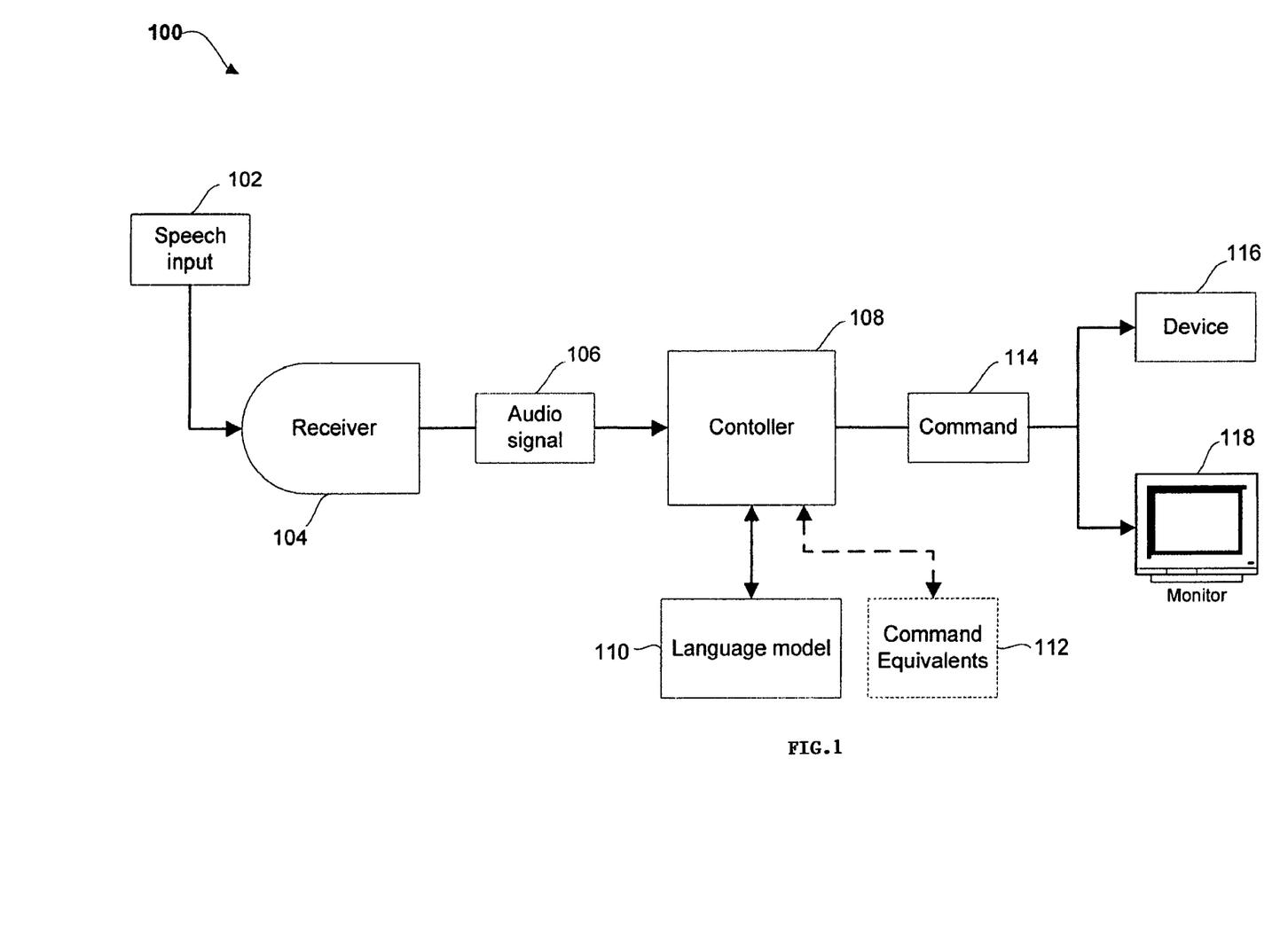
FIG. 1 is schematic diagram of a system according to the present invention.

FIG. 1 shows a system 100 for operating one or more devices using speech input according to the present invention. As will be described, the system 100 provides for the operation of one or more devices using isolated and continuous speech inputs or spoken commands. The system 100 may further accommodate either mode of speech, e.g., in succession or simultaneously, without having to reset or reconfigure. The system 100 may be useful for any number of applications including, for example, control of devices and/or processes in a medical operating room.

The system 100 includes a receiver 104 for receiving a speech input 102. The receiver 104 may be any instrument or device for receiving an incoming sound or sound wave and converting it into a digital waveform and/or an electric current or electric energy (e.g., audio signal 106). For example, the receiver 104 may be a microphone. The speech input 102 received by the receiver 104 may be any spoken utterance from a user such as a spoken word or phrase, or a collection of words or phrases. The speech input 102 preferably includes words or phrases indicative of one or more commands which a user desires to be communicated or implemented by the system 100.

The system 100 further includes a controller 108. The controller 108 may be any device, system, or part thereof that controls at least one operation or receives and/or execute one or more software programs. The controller 108 may, for example, be one of a digital signal processor, a microcontroller, a microprocessor, or a computer programmable logic device. It should be noted that the functionality associated with the controller 108 may be centralized or distributed, whether locally or remotely. The controller 108 is in communication with the receiver 104 and may receive information from the receiver 104, such as the audio signal 106. As will be described in detail below, the controller 108 may then transmit or otherwise communicate a command 114 to either or both of a device 116 or monitor 118 (e.g., display).

The system 100 may further include a language model 110. The language model 110 may exist in a storage of the system 100, in temporary memory and/or in a storage remote to the system. The language model 110 includes information used for recognizing commands indicated by a speech input 102. For example, the language model 110 may include each valid command or command sequence pertaining to devices operable by the system. The language model 110 may further include a table of active commands, including a portion or subset of the system's valid commands (or valid command sequences), for use in command recognition. As such, the controller 108 includes software for generating the table of active commands.

The system 100 may also include command equivalents 112. The command equivalents 112 include common variations and/or "out-of-vocabulary" speech inputs known to be indicative of a particular valid command. For example, the command equivalents 112 may include shorted forms of valid commands, descriptive forms, common mispronunciations, and, in some cases, foreign language equivalents of valid commands. The command equivalents 112 may exist in a storage of the system 100, in temporary memory, in a storage remote to the system, and/or in a portable storage (e.g., unique to a particular user of the system). The command equivalents 112 may further operate in conjunction with an error-rejection algorithm or software executed by the controller 108. As one of ordinary skill in the art will understand, the command equivalents 112 may therefore be continuously updated or improved by the system over time.

Figure 2:
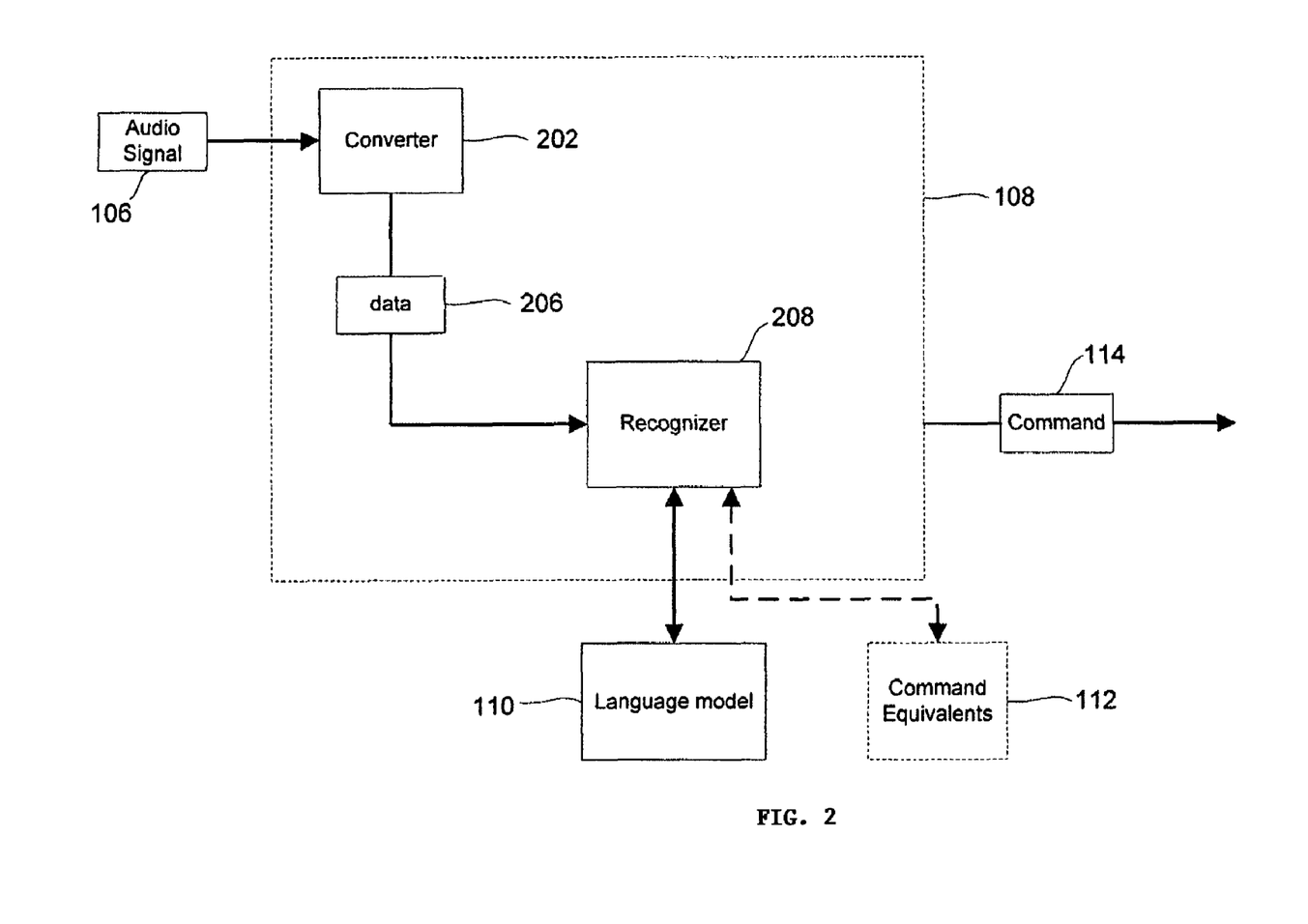
FIG. 2 is a schematic diagram of a controller of the system shown in FIG. 1.

FIG. 2 shows an exploded view of the controller 108. The controller 108 may include a converter 202. The converter 202 may be hardware, software, or a combination thereof, for converting the audio signal 106 into the data 206. The data 206 may include computer-readable data or any form of data capable of being interpreted, analyzed and/or read by a machine or computer. For example, the data 206 may include a text representation (e.g., text string) of a literal translation of a user's speech input. The data 206 may be representative of a complete speech input or utterance of a user. Alternatively, the data 206 may be representative of a portion of a speech input recognized by the system (e.g., in real time) to pertain to a particular active command.

The controller 108 further includes a recognizer 208. The recognizer 208 may be hardware, software, or a combination thereof. The recognizer 208 may include software for identifying at least one active command (e.g., from a table of active commands) represented by the data 206. In some embodiments, the recognizer 208 of the system 100 may continuously receive data (e.g., as speech input is spoken) and attempt to identify active commands contained therein in real time. The recognizer 208 may also recognize portions of commands to determine whether to expect additional data. For example, an exemplary system according to the present invention may recognize any number of command sequences beginning with the word "instrument" but only one command or command sequence beginning with "settings" (as shown in FIG. 3B). Therefore, the recognizer 208 may provide a variable inter-command pause as necessary to prevent early cut-off of a command sequence. For example, the recognizer may wait for additional data when "instrument" is recognized but immediately transmit or execute a command when "settings" is recognized. In some embodiments or modes of operation, the recognizer 208 may receive data indicative of a complete speech utterance prior to attempting to identify active commands.

The recognizer 208 of the system 100 may also include software for parsing the data 206 into one or more potential commands. The recognizer 208 may then attempt to match each potential command to an active command. Therefore, also included in the recognizer 208 may be software for querying the table of active commands to identify active commands. As described above, the recognizer 208 may likewise query the command equivalents 112 and/or a table of command equivalents to identify equivalent commands if necessary. The controller 108 further includes software for transmitting a command 114, or an active command, to at least one device operable by the active command.

Figure 3A:
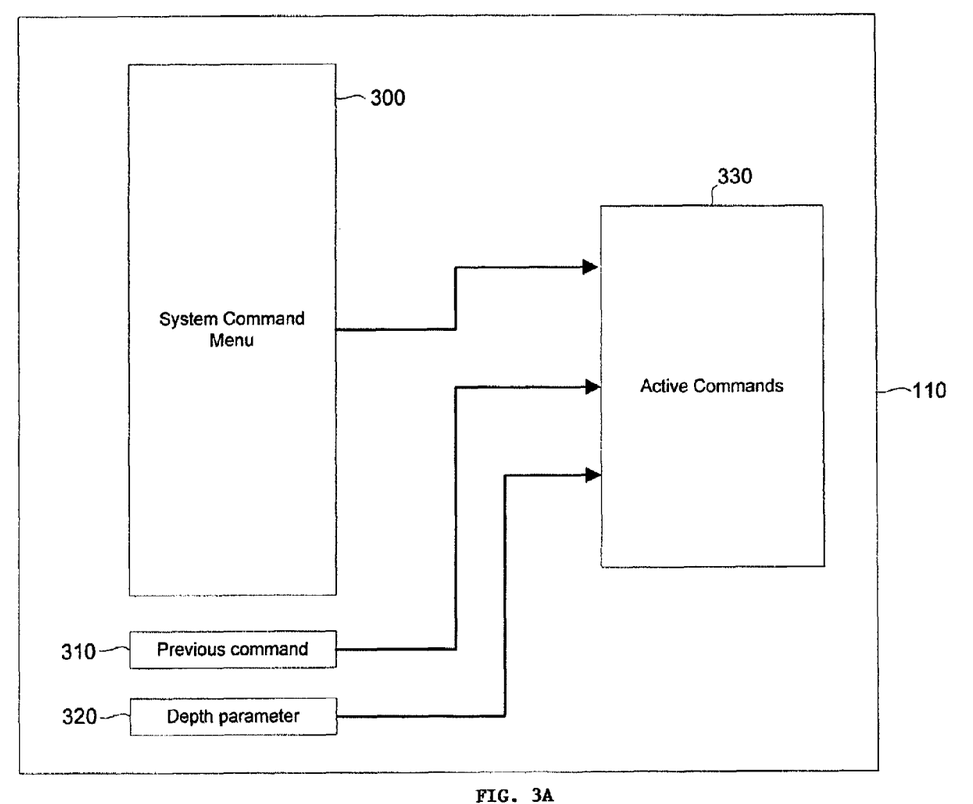
FIG. 3A is a schematic diagram of a language model of the system shown in FIG. 1.
Figure 3B:
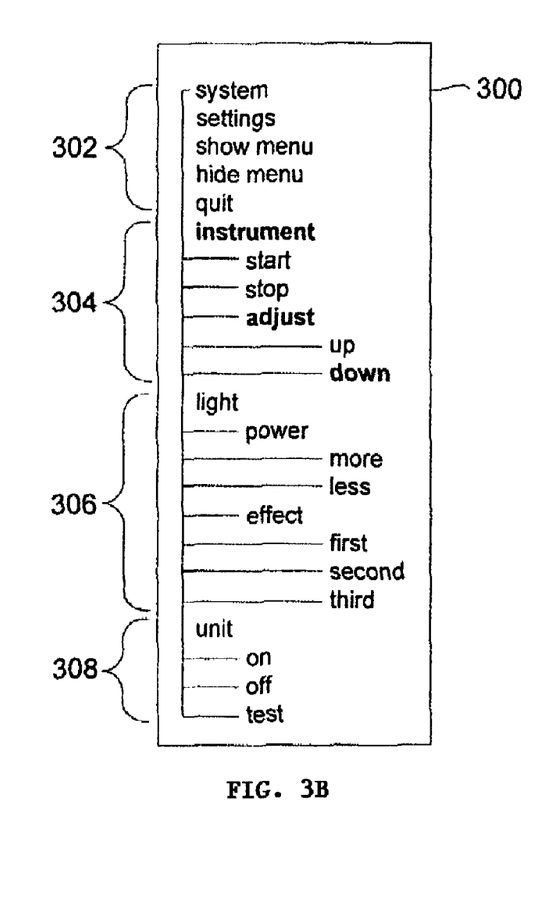
FIG. 3B is a schematic diagram of an exemplary system command menu of the system shown in FIG. 1.

FIG. 3A shows an exploded view of the language model 110 shown in FIGS. 1 and 2. The language model 110 includes a system command menu 300. The system command menu 300 preferably includes each valid command (e.g., including valid command sequences) associated with the system 100 or a substantial portion thereof. Referring to FIG. 3B, the system command menu 300 may be organized or at least displayable (e.g., via the monitor 118) in a hierarchical and/or "tree-structured" menu format. As one or ordinary skill in the art will understand, the system command menu 300 is preferably displayed to provide a user of the system 100 with a visual representation of the commands that are available during use. The display may further highlight the user's previous or current command or menu level selection. In some instances, the system 100 (e.g., via the display) may also request confirmation from a user prior to transmitting and/or executing a recognized command.

As shown in FIG. 3B, the menu 300 may include a first set of valid commands 302 including system level and/or general commands applicable to the system itself. The menu 300 may further include any number of command sets (e.g., or nodes) associated with devices operable by the system 100. For example, the menu 300 may include a set 304 of valid command/command sequences pertaining to an instrument (e.g., medical instrument or device). The exemplary instrument is shown to have three first level commands (e.g., start, stop, adjust) and two second level commands (e.g., up, down) pertaining to "adjust." Further included are sets 306 and 308 pertaining to additional devices light and unit, respectively. It should be noted, however, that the system command menu 300 shown in FIG. 3B and the commands contained therein is only a simplified example of a menu 300. As one of ordinary skill in the art will understand, the menu 300 and/or language model 110 of the present invention can be in any desired format and include any number of desired commands and/or menu levels.

Referring back to FIG. 3A, the language model 110 (e.g., or any other location or storage of the system 100) may include a previous command 310. As described in more detail below, the previous command 310 is retained by the system 100 for use in generating a table or menu of active commands. The previous command 310 may be the last active command executed or transmitted to a device by the controller 108, or the last active or valid command to be spoken by a user of the system 100. The language model 110 may further include a depth parameter 320 for use in generating the table of active commands. The depth parameter 320 may, for example, be a parameter indicative of a number of menu levels to be evaluated for use in the active command menu and/or a preferred deviation from the location of the previous command 310 or current position in the menu 302. The system 100 may include a single depth parameter 320 or any number of depth parameters 320. For example, each device operable by the system may have one or more depth parameters associated therewith. Further, a user of the system may have a unique and/or preferred depth parameter. It is contemplated that the depth parameter 320 may be set by a user of the system and/or modified at any time.

The language model 110 further includes active commands 330 or a table or menu of active commands. The table of active commands 330 is used by the controller 108 and/or recognizer 208 in identifying at least one active command represented by the data 206. As will become evident upon reading the following description, the table of active commands 330 includes both isolated commands and concatenated command sequences for use by the recognizer 208. The active commands 330 may be located in any storage of or in communication with the system 100 and/or in temporary memory in communication with the controller 108. The active commands 330 may further be generated, regenerated and/or updated at any time. For example, the table of active commands 330 may be generated or updated each time a user selects or changes levels in the menu 300 or dynamically as a user is speaking desired commands.

Figure 3C:
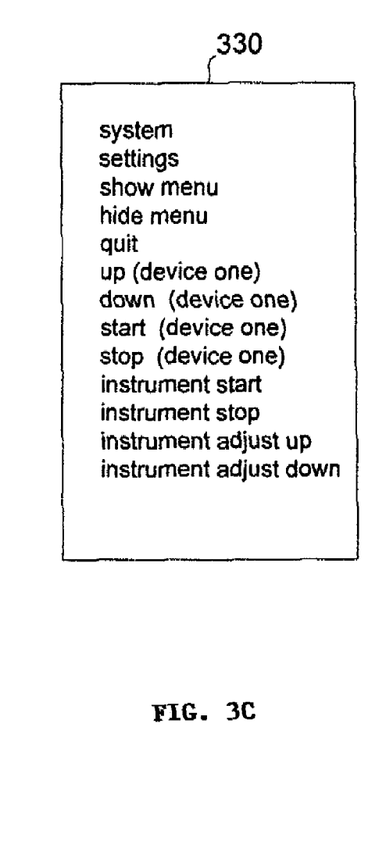
FIG. 3C is a schematic diagram of an exemplary active command menu of the system shown in FIG. 1.

FIG. 3C shows an exemplary table of active commands 330 of the language model 110. The active commands 330 may include any number of commands (e.g., command sequences) selected from the menu 300. Further, a command in active commands 330 may include a single command word, e.g., such as the system level commands, or a command sequence (e.g., "instrument start"). As one of ordinary skill in the art will therefore understand, the table of active commands 330 provides for the simultaneous recognition of isolated and continuous speech input.

Figure 4:
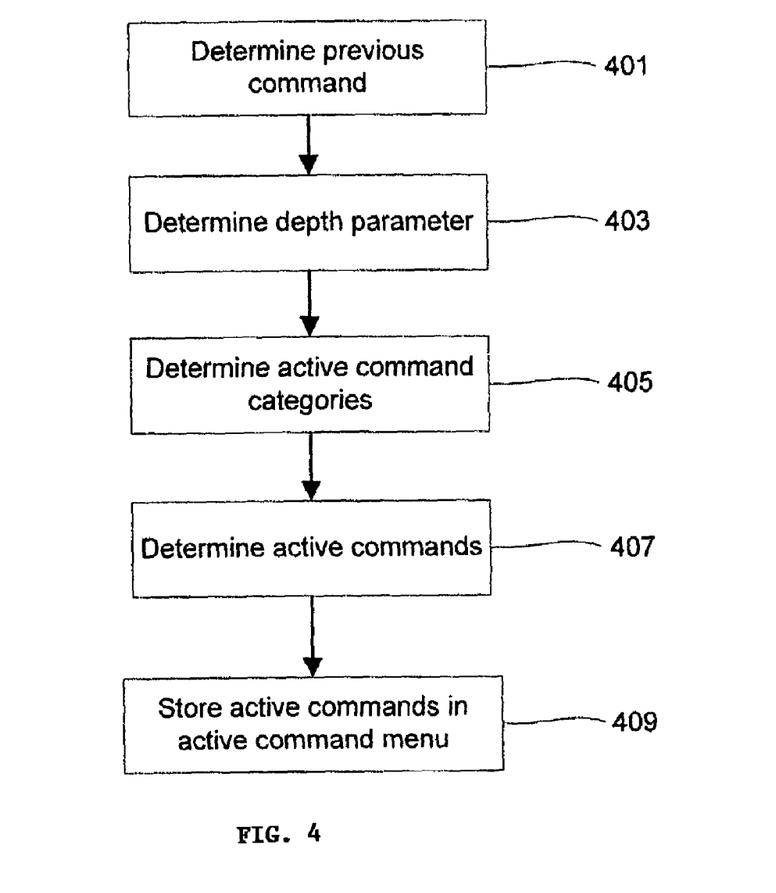
FIG. 4 is a method of generating a table of active commands employable by the system shown in FIG. 1.

FIG. 4 shows a method of generating the table of active commands 330. In a first step, the system 100 may determine or access the previous command 310 (step 401). As one of ordinary skill in the art will understand, the previous command 310 may identify the particular position on the menu 300 where the system currently "resides." Concurrently, or in any order, the depth parameter may also be determined (step 403). The current menu location (and/or previous command 310) and the depth parameter therefore provide the basis for rules that define which commands may be recognized in the next speech input or utterance.

The active command categories and/or nodes are then determined (step 405). The active command nodes are those selected or determined to be included for the generating of the table of active commands at any given time. Therefore, any number of nodes having valid and operable commands may not be included at a particular time. For example, the determination of active nodes may be based on the current menu location (or previous command) alone or in combination with user or system preferences. In one embodiment, the node associated with the previous command 310 may be determined as the only active node. However, preferably additional nodes are determined as active nodes such as each of the system command nodes.

In other embodiments, any number of other preferences or settings may be used in determining the active nodes. For example, a first setting (e.g., normal) may provide for selection of the node associated with the previous command as well as each system command node. Referring to FIG. 3B, a previous command 310 may be "down" or "instrument adjust down" and therefore the associated node would be "adjust." The system nodes (e.g., global nodes) would include "system", "settings" show menu", "hide menu" and "quit." Other settings may provide for the determination of other active nodes, such as nodes related to the same procedure and/or grouping of devices.

Next, active commands and/or command sequences are determined from the active nodes (step 407). Preferably, the depth parameter 320 is employed in making the determinations. The depth parameter 320 may be used to define how far (e.g., how many levels) into each active node the system should search in determining the active commands. For example, the depth parameter 320 may indicate a maximum of two levels. Therefore, if "instrument" is determined to be an active node, the following commands will be added to the table of active commands: "instrument start," "instrument stop," and "instrument adjust." If the depth parameter 320 is indicative of three levels, "instrument adjust up" and "instrument adjust down" would further be included.

As shown in FIG. 3C, additional commands may be included such as isolated commands related to the previous command 310 or current menu level. For example, if the previous command was "instrument adjust down" or simply "down", the table of active commands 330 may, in some embodiments, include the commands "up" and "down." Further, the table of active commands may also include "start" and "stop" pertaining to "instrument" if so desired.

Figure 5:
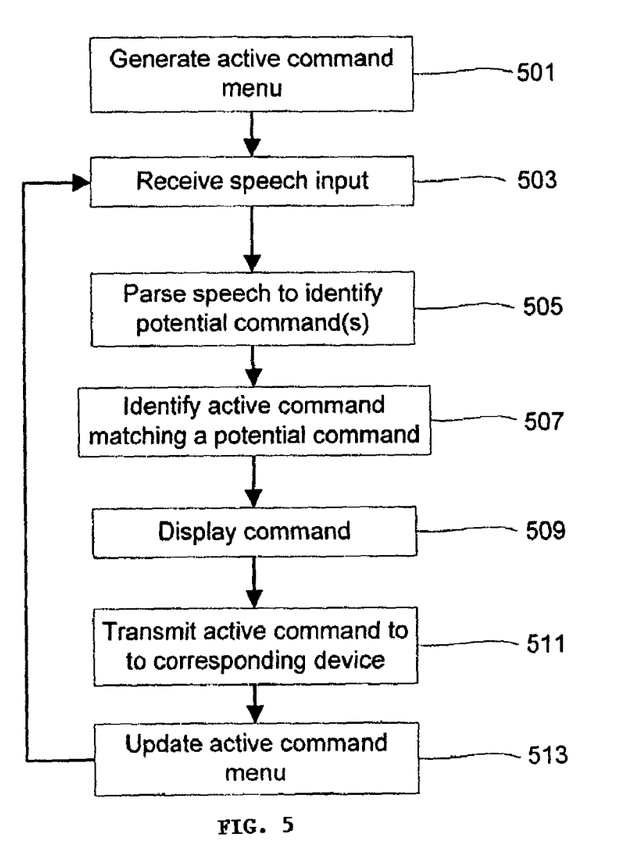
FIG. 5 is a method of processing a speech input employable by the system shown in FIG. 1.

FIG. 5 shows a method of processing a speech input employable by the system 100. The method includes a first step of generating the active command menu or table of active commands (step 501). This step may, for example, be executed upon powering the system on and/or upon a user selecting a new command node or issuing a new command. As one of ordinary skill in the art will understand upon reading the above description, this step may include updating an existing table and the active commands. Next, a speech input, and/or data 206 converted from speech input, is received (step 503). In some embodiments, the data may then be parsed to identify potential commands in the data (step 505).

In a next step, active commands are identified which pertain to a portion of the data and/or potential commands identified in the data (step 507). The table of active commands is queried to determine if any portion of the data corresponds to an active command. It should be understood that any number of active commands may be identified from the data. For example, a user may speak two commands in the same utterance, each pertaining to a different device.

Each identified command may then be displayed or indicated via the monitor (step 509) and transmitted to a corresponding device (step 511). In some embodiments, a user may be prompted to accept or verify the displayed command prior to execution. Finally, the active command menu or table of active commands is updated as necessary given the new previous command.

As one of ordinary skill in the art will understand, the table of active commands of the present invention provides for the simultaneous support of both isolated and connection or continuous command recognition while maintaining or increasing the speed and accuracy of the system. The present invention therefore allows a user to choose, at any given time, to operate in either or both modes. Further, multiple users of the system may each choose to address the system in their preferred mode of speech at any given time (step 513).

Although the invention has been described with reference to a particular arrangement of parts, features and the like, these are not intended to exhaust all possible arrangements or features, and indeed many modifications and variations will be ascertainable to those of skill in the art.

What is claimed is:

1. A system for operating one or more devices using speech input, comprising:
   a receiver for receiving a speech input including at least one of an isolated speech input and a continuous speech input;
   a controller in communication with said receiver;
   software executing on said controller for converting the speech input into computer-readable data;
   a command menu including a plurality of command menu levels;
   software executing on said controller for generating a set of active commands, the active commands selected from at least two different levels of said command menu;
   software executing on said controller for querying the set of active commands to identify one active command represented by the computer-readable data if the speech input includes isolated speech input and at least two active commands represented by the data if the speech input includes continuous speech input, each of the at least two active commands from a different command menu level; and
   software executing on said controller for implementing the one or more identified active commands via one or more devices operable by the system.

2. The system according to claim 1, wherein said system command menu includes one or more global commands.

3. The system according to claim 2, further comprising:
   software executing on said controller for identifying a global command represented by the data; and
   software executing on said controller for implementing the global command.

4. The system according to claim 1, wherein the one or more devices operable by the system are medical devices.

5. The system according to claim 1, wherein the set of active commands is generated and updated dynamically during use based on a current command menu location and a depth parameter.

6. A system for operating one or more devices using speech input, comprising:
   a receiver for receiving a speech input including at least one of an isolated speech input and a continuous speech input;
   a controller in communication with said receiver;
   software executing on said controller for converting the speech input into computer-readable data;
   software executing on said controller for generating a set of active commands, the set including active commands selected from at least two different levels of a command menu, wherein the active commands are generated and updated dynamically during use based on a current command menu location and a depth parameter;
   software executing on said controller for querying the set of active commands and identifying at least one active command represented by the data if the speech input includes isolated speech input and at east two active commands represented by the data if the speech input includes continuous speech input; and
   software executing on said controller for sending data for implementing the one or more identified active commands to one or more devices operable by the system.

7. The system according to claim 6, wherein each of the at least two active commands are sequential commands each from a different level of the command menu.

8. The system according to claim 6, wherein the set of active commands includes at least one global command.

9. The system according to claim 8, further comprising:
   software executing on said controller for identifying a global command represented by the data; and
   software executing on said controller for implementing the global command.

10. The system according to claim 6, wherein the one or more devices operable by the system are medical devices.

11. The system according to claim 6, wherein the set of active commands includes at least one isolated command phrase and at least one concatenated command phrase.

12. The system according to claim 6, wherein the depth parameter is indicative of a deviation from a current menu position.

13. The system according to claim 6, wherein the depth parameter is indicative of a number of menu levels.

14. The system according to claim 6, wherein said software for identifying at least one active command parses the data into one or more potential commands.

15. The system according to claim 6, wherein said software for identifying at least one active command queries a table of command equivalents.

16. A method of controlling a device using a speech input, comprising the steps of:
   determining commands associated with each device of a system from a command menu;
   generating a set of active commands, wherein the set includes active commands selected from at least two different levels of the command menu;
   receiving a speech input including at least one of an isolated speech input and a continuous speech input;
   converting the speech input into computer-readable data;
   querying the set of active commands and identifying one active command represented by the data if the speech input includes isolated speech input and at least two active commands represented by the data if the speech input includes continuous speech input; and
   sending data for implementing the one or more active commands to at least one device to which the active commands pertain.

17. The method according to claim 16, wherein the step of generating the set of active commands includes determining the last active command identified.

18. The method according to claim 16, wherein the step of generating the set of active commands includes utilizing a depth parameter, the depth indicative of a number of menu levels.

19. The method according to claim 16, wherein the step of identifying at least one active command includes parsing the data into one or more potential commands.

20. The method according to claim 16, further comprising the step of:
 displaying the identified at least one active command.

21. The method according to claim 16, wherein the step of identifying the at least one active command includes generating a prompt to a user of the system.

22. The method according to claim 16, wherein the set of active commands is generated and updated dynamically during use based on a current command menu location and a depth parameter.

* * * * *